Patented Oct. 1, 1940

2,216,229

UNITED STATES PATENT OFFICE 2,216,229

MANUFACTURE OF NEW AZO DYESTUFFS

Wilfrid Herbert Cliffe, Blackley, Manchester, England, assignor to Imperial Chemical Industries Limited, a corporation of Great Britain No Drawing. Application July 13, 1938, Serial No. 219,097. In Great Britain July 14, 1937

2 Claims. (Cl. 260—160)

This invention relates to new disazo dyestuffs and to their manufacture.

An object of the invention is to provide new disazo dyestuffs. A further object is to provide new disazo dyestuffs which are soluble in water. A further object is to provide new acid disazo dyestuffs suitable for wool and silk. A further object is to provide a process for the manufacture of such new disazo dyestuffs. Other objects will appear hereinafter.

The dyestuffs of the invention are water-soluble disazo dyestuffs and are obtained either by coupling tetrazotised diaminobenzoyl-N-alkyl anilides, as defined below, with two molecular proportions of the same or different coupling components, or by coupling a diazotised compound corresponding to the diaminobenzoyl-N-alkylanilides above mentioned, but having a nitro substituent in place of either but not both amino substituents, with one molecular proportion of a coupling component, reducing the nitro substituent to an amino substituent, diazotising and then coupling with one molecular proportion of the same or a different coupling component.

The diaminobenzoyl-N-alkylanilides referred to above are those of the formula

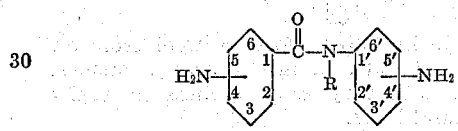

in which R stands for aralkyl or for certain substituted alkyl radicals, namely hydroxyalkyl, alkoxyalkyl, acetoxyalkyl, and sulphuric esters of hydroxyalkyl, the alkyl radical being ethyl, propyl or butyl, and in which either or both of the phenylene radicals may carry one or more substituents including short-chain alkyl substituents.

Those dyestuffs which contain a sulphato group attached to a hydroxyl substituent, may also be made by first preparing the corresponding dyestuff containing the hydroxyl substituent and then treating this dyestuff with an agent adapted to introduce a sulphato group, e. g. with 80% sulphuric acid.

As coupling components, I use for example, phenols, naphthols, naphtholsulphonic acids, naphthylamines, naphthylaminosulphonic acids, aminonaphthols or their sulphonic acids or N-substituted derivatives, arylpyrazolones, arylpyrazolone sulphonic or carboxylic acids and acetoacetic arylamides.

The new dyestuffs must contain a sufficiency of sulphonic acid, sulphuric ester or other groups to ensure that they are soluble in water. These sulphonic or other solubilising groups need to be originally present in one or more of the dyestuff components, except that as above mentioned a sulphato group may subsequently be introduced into a hydroxydisazo dyestuff.

The diamino- or nitroaminobenzoyl-N-aralkyl-, hydroxyalkyl- or alkoxyalkyl-anilides may be obtained by condensing a mononitro-N-aralkyl, hydroxyalkyl- or alkoxyalkylarylamine of the benzene series with a nitroaroyl chloride of the benzene series, and then reducing one or both nitro substituents.

The diamino- or nitroaminobenzoyl-N-acetoxyalkylanilides may be obtained by condensing a mononitro-N-hydroxyarylamine of the benzene series with a nitroaroyl chloride of the benzene series, heating the product of the reaction with acetic anhydride and then reducing one or both nitro substituents.

The new dyestuffs dye wool from a neutral or acid bath and the resulting dyeings are characterised by very good fastness to washing, milling and light.

The invention will be understood by a consideration of the following examples (which are purely illustrative and not limiting), in which the parts are parts by weight.

Example 1

33.8 parts of 3:3'-diaminobenzoyl-N-β-hydroxyethylanilide, which compound is made as described below, are dissolved in a mixture of 62.5 parts of 36% aqueous hydrochloric acid and 500 parts of water, and tetrazotised at 0-5° C., with a solution of 17.2 parts of sodium nitrite in 125 parts of water. The resulting tetrazo solution is gradually added to an ice-cold solution which contains 63.6 parts of 1-(4'-sulphophenyl)-3-methyl-5-pyrazolone and 50 parts of anhydrous sodium carbonate in 500 parts of water. Coupling is rapid and the new dyestuff is filtered off and dried. The new dyestuff has, in the form of free acid, the formula

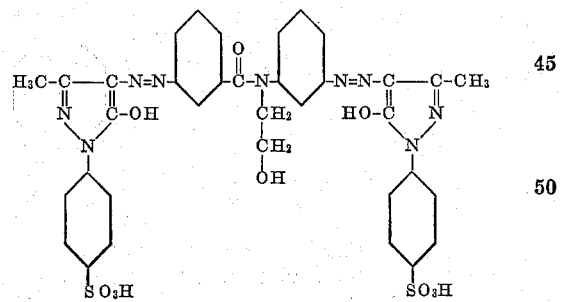

It is a brown powder which dissolves in water. It dyes wool from a neutral or acid bath in bright yellow shades. The dyeings have very good fastness to washing and light.

The 3:3'-diaminobenzoyl-N-β-hydroxyethylanilide which is used above and is a new compound is made as follows.

182 parts of N-β-hydroxyethyl-m-nitroaniline and 185.5 parts of m-nitrobenzoyl chloride are dissolved in 2000 parts of toluene and the solution is boiled until the reaction is complete. The toluene is then removed by distilling in steam. 3:3'-dinitrobenzoyl-N-β-hydroxyethylanilide (M. P. 173°), remains and is reduced to the required diamine by means of iron and hydrochloric acid in either water or ethyl alcohol.

*Example 2*

30 parts of the dyestuff obtained as in Example 1 are dissolved in 450 parts of concentrated sulphuric acid, the solution agitated for 12 hours and afterwards poured upon ice. The new dyestuff is filtered off, stirred with 450 parts of water containing 45 parts of salt and converted into the sodium salt with sodium carbonate. It is then filtered off and dried. The new dyestuff has, in the form of free acid, the formula set out in Example 1, except that in place of —CH$_2$—CH$_2$—OH attached to nitrogen it carries the group —CH$_2$—CH$_2$—O—SO$_3$H. It is soluble in water and dyes wool in similar shades of similar properties to those of the dyestuff of Example 1.

*Example 3*

A tetrazo solution obtained as in Example 1 is gradually added to an ice-cold solution containing 82.3 parts of the sodium salt of 2-phenylamino-8-naphthol-6-sulphonic acid and 50 parts of anhydrous sodium carbonate in 600 parts of water. Coupling is rapid and the dyestuff is filtered off and dried. The new dyestuff has, in the form of free acid, the formula

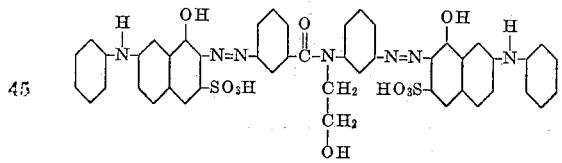

It is soluble in water. The dyeings have very good washing, milling and light fastness.

*Example 4*

33.1 parts of 3:3'-diamino-6'-methylbenzoyl-N-benzylanilide are dissolved in a mixture of 62.5 parts of 36% aqueous hydrochloric acid and 600 parts of water and tetrazotised at 0°–5° C. with a solution of 17.2 parts of sodium nitrite in 125 parts of water. The tetrazo solution is then added gradually to an ice-cold solution containing 81 parts of the disodium salt of 1-acetylamino-8-naphthol-3:6-disulphonic acid and 50 parts of anhydrous sodium carbonate in 600 parts of water. Coupling is rapid and the dyestuff is salted out, filtered off and dried. The new dyestuff has, in the form of free acid, the formula

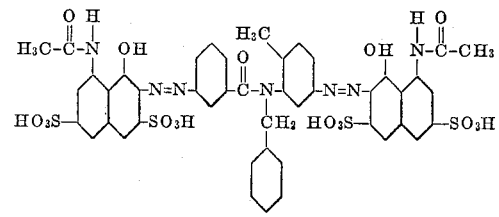

It is soluble in water. It dyes wool from an acid or neutral bath in bright bluish-red shades. The dyeings have very good fastness to washing, milling and light.

The 3:3'-diamino-6'-methylbenzoyl-N-benzylanilide, which is used above and is a new compound, is made as follows.

A solution containing 60.5 parts of 2-benzylamino-4-nitrotoluene and 46.4 parts of m-nitrobenzoyl chloride in 200 parts of toluene is boiled until interaction is complete. The 3:3'-dinitro-6'-methylbenzoyl-N-benzylanilide (M. P. 172–173°) which remains is reduced to the required diamine (M. P. 126°) by means of iron and hydrochloric acid in either water or ethyl alcohol.

*Example 5*

A tetrazo solution obtained as in Example 4, is gradually added to a solution containing 70 parts of the disodium salt of 2-naphthol-6:8-disulphonic acid and 40 parts of anhydrous sodium carbonate in 800 parts of water. The new dyestuff is rapidly formed and is filtered off and dried. It has, in the form of free acid, the formula

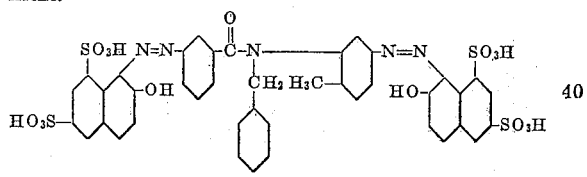

and is soluble in water. It dyes wool from an acid or neutral bath in bright orange shades. The dyeings have very good fastness to washing, milling and light.

*Example 6*

A tetrazo solution obtained as in Example 4 is added to a solution containing 61 parts of the sodium salt of 2-acetylamino-8-naphthol-6-sulphonic acid and 40 parts of anhydrous sodium carbonate in 800 parts of water. Coupling is rapid and the dyestuff is filtered off and dried. The dyestuff has, in the form of free acid, the formula

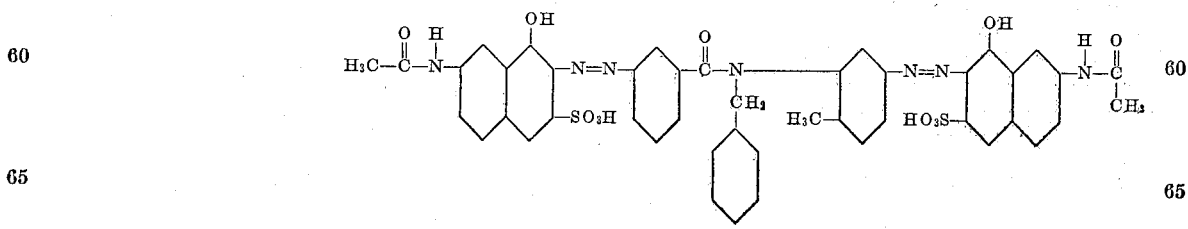

It is soluble in water. It dyes wool from an acid or neutral bath in bright scarlet shades. The dyeings have very good fastness to washing, milling, and light.

*Example 7*

39.6 parts of 4:3'-diaminobenzoyl-N-benzylanilide are dissolved in a mixture of 62.5 parts of 36% aqueous hydrochloric acid and 600 parts of water and tetrazotised at 0-5° C. with a solution of 17.2 parts of sodium nitrite in 125 parts of water. The tetrazo solution is then gradually added to an ice-cold solution containing 87 parts of the disodium salt of 2-naphthol-6:8-disulphonic acid and 40 parts of anhydrous sodium carbonate in 800 parts of water. The new dyestuff is rapidly formed and is salted out, filtered off and dried. It has, in the form of free acid, the formula

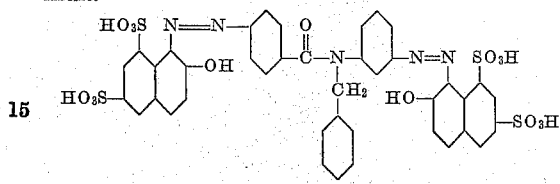

It is soluble in water and dyes wool from an acid or neutral bath in yellow shades of very good fastness to washing and milling.

The 3:4'-diamino-4-methylbenzoyl-N-benzylanilide which is used above is a new compound, which is made as follows: A solution of 68.4 parts of 4-nitro-N-benzylaniline and 60 parts of 3-nitro-4-methylbenzoyl chloride in 250 parts of toluene is boiled until the reaction is complete. The resulting 3:4'-dinitro-4-methylbenzoyl-N-benzylanilide (M. P. 154° C.) is then reduced to the required diamine (M. P. 157° C.) with iron and hydrochloric acid in either water or ethyl alcohol.

Further dyestuffs obtained according to the invention are given in the following table:

| Example | Diazo component | Coupling component | Shade on wool |
|---|---|---|---|
| 9 | 1 mol. of 3:3'-diaminobenzoyl-N-β-hydroxyethylanilide. | 2 mols. of 2-acetylamino-8-naphthol-6-sulphonic acid | Scarlet. |
| 10 | ----do---- | 2 mols. of 2-naphthol-6:8-disulphonic acid | Orange. |
| 11 | 1 mol. of 3:3'-diamino-6'-methylbenzoyl-N-benzylanilide. | 2 mols. of 1-(2':5'-dichloro-4'-sulphophenyl)-3-methyl-5-pyrazolone. | Yellow. |
| 12 | ----do---- | 2 mols. of 2-naphthol-8-sulphonic acid | Orange. |
| 13 | ----do---- | 2 mols. of 2-acetylamino-5-naphthol-7-sulphonic acid | Orange-brown. |
| 14 | ----do---- | 2 mols. of 1-naphthol-4-sulphonic acid | Scarlet. |
| 15 | ----do---- | 2 mols. of 2-N-β-hydroxy-ethylamino-8-naphthol-6-sulphonic acid. | Brown. |
| 16 | ----do---- | 2 mols. of 2-phenylamino-8-naphthol-6-sulphonic acid | Do. |
| 17 | ----do---- | 2 mols. of 1-benzoylamino-8-naphthol-4:6-disulphonic acid. | Red. |
| 18 | 1 mol. of 4:3'-diamino-benzoyl-N-benzylanilide | 2 mols. of 1-naphthol-4-sulphonic acid | Scarlet. |
| 19 | ----do---- | 2 mols. of 2-phenylamino-8-naphthol-6-sulphonic acid | Brown. |
| 20 | 1 mol. of 3:4'-diamino-4-methylbenzoyl-N-benzylanilide. | 2 mols. of 2-naphthol-8-sulphonic acid | Orange. |
| 21 | ----do---- | 2 mols. of 2-phenylamino-8-naphthol-6-sulphonic acid | Brown. |

It is soluble in water and dyes wool from an acid or neutral bath in bright orange shades of very good fastness to washing and milling.

The 4:3'-diaminobenzoyl-N-benzylanilide which is used above is a new compound and is made as follows: A solution containing 68.4 parts of 3-nitro-N-benzylaniline and 55.8 parts of p-nitrobenzoyl chloride in 450 parts of toluene is boiled until the reaction is complete. The resulting 4:3'-dinitrobenzoyl-N-benzylanilide (M. P. 147° C.) is then reduced to the required diamine (M. P. 179° C.) by means of iron and hydrochloric acid in either water or ethyl alcohol.

*Example 8*

41.8 parts of 3:4'-diamino-4-methylbenzoyl-N-benzylanilide are dissolved in a mixture of 62.5 parts of 36% aqueous hydrochloric acid and 600 parts of water and tetrazotised at 0-5° C. with a solution of 17.2 parts of sodium nitrite in 125 parts of water. The tetrazo solution is then added gradually to an ice-cold solution which contains 63.6 parts of 1-(4'-sulphophenyl)-3-methyl-5-pyrazolone and 40 parts of anhydrous sodium carbonate in 800 parts of water. When coupling is complete the dye is salted out, filtered off and dried. The new dye has, in the form of free acid, the formula

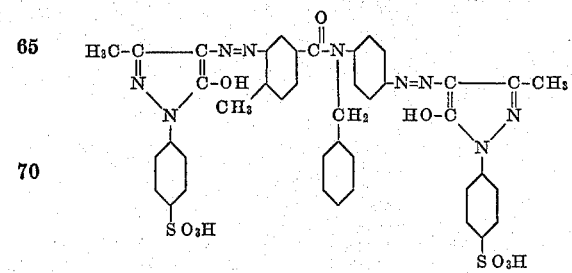

As many apparently widely different embodiments of this invention may be made without departing from the spirit and scope thereof, it is to be understood that the invention is not limited to the specific embodiments thereof except as defined in the appended claims.

I claim:

1. A new disazo dyestuff having in the form of the free acid the formula

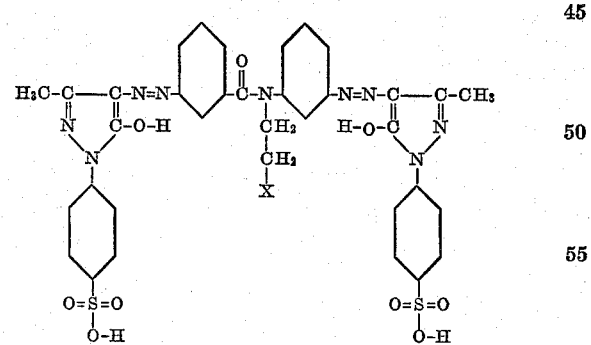

where X is selected from the group consisting of acetoxy, —OH and —O—SO$_3$H.

2. Process for the manufacture of new disazo dyestuffs which comprises the step of sulphating a dyestuff of formula

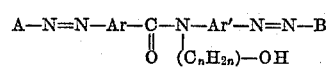

in which A and B are azo dyestuff coupling components, Ar and Ar' are phenylene radicals and $n$ is an integer greater than 1 and less than 5.

WILFRID HERBERT CLIFFE.